No. 693,480. Patented Feb. 18, 1902.
W. WRIGHT.
STAMP AFFIXING DEVICE.
(Application filed Apr. 16, 1901.)
(No Model.)
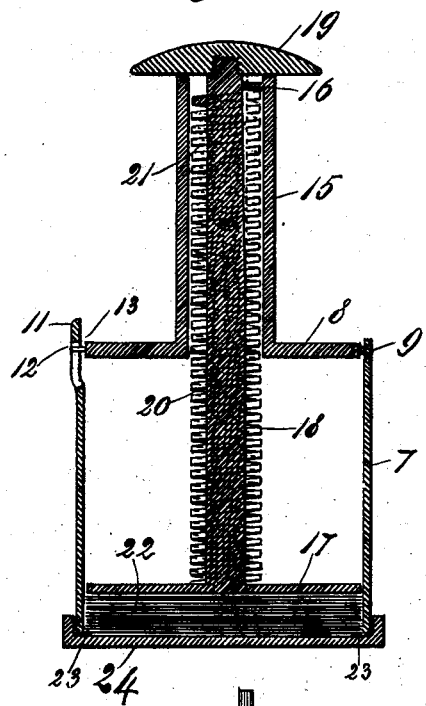
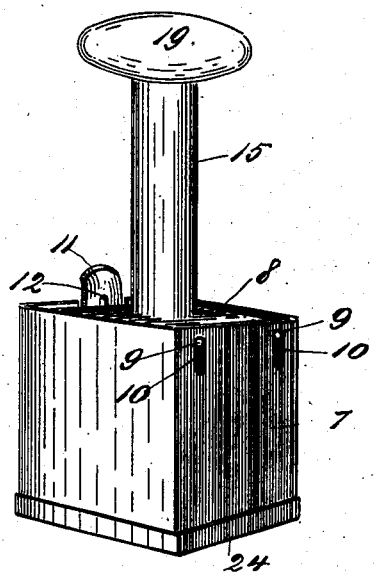
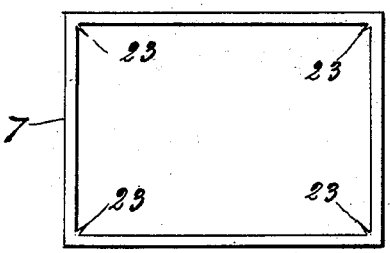
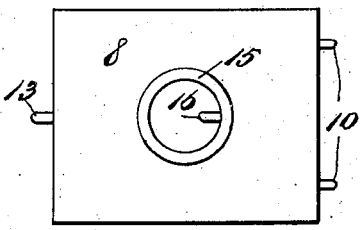
WITNESSES
INVENTOR
William Wright
BY
Edgar Yate
ATTORNEYS
THE NORRIS PETERS CO., PHOTO-LITHO., WASHINGTON, D. C.

UNITED STATES PATENT OFFICE.

WILLIAM WRIGHT, OF NEW YORK, N. Y.

STAMP-AFFIXING DEVICE.

SPECIFICATION forming part of Letters Patent No. 693,480, dated February 18, 1902.

Application filed April 16, 1901. Serial No. 56,062. (No model.)

*To all whom it may concern:*

Be it known that I, WILLIAM WRIGHT, a citizen of the United States, residing at New York, in the county of New York and State of New York, have invented certain new and useful Improvements in Stamp-Applying Devices, of which the following is a full and complete specification, such as will enable those skilled in the art to which it appertains to make and use the same.

The object of this invention is to provide an improved device for applying postage-stamps which is simple in construction and operation and by means of which postage-stamps may be quickly and easily applied to letters, packages, or other mail-matter.

The invention is fully disclosed in the following specification, of which the accompanying drawings form a part, in which the separate parts of my improvement are designated by the same reference characters in each of the views, and in which—

Figure 1 is a central vertical section of my improved stamp-applying device; Fig. 2, a perspective view thereof; Fig. 3, a side view of a detail of the construction; Fig. 4, a bottom plan view of the casing of the device, and Fig. 5 a top plan view of the top portion of the device.

In the drawings forming part of this specification all the views thereof are on an enlarged scale, and in the practice of my invention I provide a casing 7, which is rectangular in form and preferably of the same dimensions in cross-section as the stamp to be applied, and this casing is provided with a removable top piece 8, provided at one side with pins 9, which are adapted to be inserted in vertical slots or openings 10 formed in one side of the casing 7.

That side of the casing 7 opposite the side in which the slots or openings 10 are formed is provided with a spring-tongue 11, which extends outwardly and upwardly above the top of the casing 7, and said spring-tongue is provided, preferably on the same transverse level as the slots or openings 10 and extending a little above said slots or openings, with a vertical slot or opening 12, adapted to receive the pin 13 formed on the corresponding side of the top piece 8.

The top piece 8 of the casing is provided with a vertical tubular member 15, at the upper end of which is an inwardly-directed pin 16, and placed in the casing 7 is a plunger 17, adapted to be moved freely in said casing and of the same or slightly less dimensions than the inner dimensions of said casing, and said plunger is provided centrally with an upwardly-directed shaft 18, which passes up through the tubular member 15 of the top piece 8 of the casing and is provided at its upper end with a removable cap 19.

A spiral spring 20 incloses the shaft 18 and bears on the plunger 17 at its lower end and on the inwardly-directed pin 16 at the top of the tubular member 15, and said shaft 18 is provided at one side with a longitudinal slot or groove 21, in which the pin 16 moves, and said spring 20 serves to hold the plunger 17 in a depressed position; but said plunger may be raised almost to the top of the casing 7 against the operation of said spring when desired.

In practice any desired number of stamps 22 may be placed in the bottom of the casing 7, and these stamps are held in position by short inwardly-directed pins or prongs 23, arranged in the corners of the casing 7, at the bottom thereof, and said casing is also preferably provided with a removable bottom 24, which is designed to keep the stamps clean and to prevent the accidental removal of the stamps when the stamping device is not in use, and said removable bottom may be connected with the casing 7 in any desired manner.

The operation will be readily understood from the foregoing description when taken in connection with the accompanying drawing and the following statement thereof.

The stamps are placed in the bottom of the casing 7 in any desired numbers, the plunger 17 being raised for this purpose, and when it is desired to apply the stamps to a letter or other package the bottom of the device is pressed on a moistening-pad, and said device is then raised from the pad and pressed onto the envelop or other package. In this operation the stamp adheres to the envelop or other package, and when the stamping device is raised the said stamp remains in position on the envelop or other package, the corners thereof being pulled from beneath the pins or prongs 23.

It will be observed that the top piece 8 has a slight vertical movement independent of the movement of the plunger 17, and while said plunger has a continuous pressure on the stamps within the casing 7 the top piece 8, including the plunger 17, has the slight vertical movement above referred to, which when the stamping device is lifted from the envelop or other package by means of the tube 15, which serves as a handle, the pressure on the stamps is slightly released, which facilitates the detaching of the bottom stamp and aids to retain the remaining stamps in the casing 7.

The top piece 8 may be removed whenever desired by pressing outwardly on the spring 11 and raising the adjacent side of the top piece, in which operation the pins 9 will come out of the slots 10, and said top piece may be replaced by reversing this operation.

This device is simple in construction and operation and comparatively inexpensive, and is perfectly adapted to accomplish the result for which it is intended, and I reserve the right to make all such alterations as fairly come within the scope of my invention.

Having fully described my invention, what I claim as new, and desire to secure by Letters Patent, is—

1. A stamp-affixing device, comprising a casing open at the bottom and having a removable top piece, provided with a central vertical tubular member, a plunger mounted in said casing and provided with a shaft passing upwardly through said tubular member, a spring mounted on said shaft and bearing on said plunger and provided with a bearing at the top of said tubular member, a detachable cap for said tubular member connected with the top of said shaft, and means whereby the removable top piece of the casing is provided with a slight vertical movement, substantially as shown and described.

2. A stamp-affixing device, comprising a casing open at the bottom and provided in one side near the top thereof with vertical slots or openings and at the opposite side with a spring-tongue having a vertical slot or opening, a detachable top piece provided at one side with pins adapted to enter the first-named slots or openings and at the opposite side with a pin adapted to enter the slot or opening and said spring-tongue, said top piece being also provided with a vertically-arranged tubular member, a plunger mounted in said casing and provided with a shaft which passes upwardly through said tubular member, a pin secured to the tubular member extending into the same adjacent to the top, a spring mounted on said shaft and bearing on said plunger at one end and at the top of said tubular member on the pin secured to such tubular member, said shaft being also provided with a detachable cap for said tubular member, substantially as shown and described.

In testimony that I claim the foregoing as my invention I have signed my name, in presence of the subscribing witnesses, this 15th day of April, 1901.

WILLIAM WRIGHT.

Witnesses:
 F. A. STEWART,
 F. F. TELLER.